(12) United States Patent
Tsujimoto et al.

(10) Patent No.: US 8,312,711 B2
(45) Date of Patent: Nov. 20, 2012

(54) EXHAUST PURIFICATION DEVICE OF INTERNAL COMBUSTION ENGINE

(75) Inventors: Kenichi Tsujimoto, Susono (JP); Shinya Hirota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 762 days.

(21) Appl. No.: 12/448,414

(22) PCT Filed: Feb. 25, 2008

(86) PCT No.: PCT/JP2008/053715
§ 371 (c)(1),
(2), (4) Date: Jun. 19, 2009

(87) PCT Pub. No.: WO2008/105549
PCT Pub. Date: Sep. 4, 2008

(65) Prior Publication Data
US 2010/0089038 A1    Apr. 15, 2010

(30) Foreign Application Priority Data

Mar. 1, 2007  (JP) ................................ 2007-051406

(51) Int. Cl.
*F01N 3/00* (2006.01)
*F01N 3/10* (2006.01)

(52) U.S. Cl. ................. 60/286; 60/295; 60/297; 60/301
(58) Field of Classification Search ............ 60/286, 60/295, 297, 301, 303, 311
See application file for complete search history.

(56) References Cited

U.S. PATENT DOCUMENTS

| | | | |
|---|---|---|---|
| 6,209,317 B1 * | 4/2001 | Hirota | 60/297 |
| 2003/0182935 A1 * | 10/2003 | Kawai et al. | 60/286 |
| 2003/0211024 A1 | 11/2003 | Wojichowski | |
| 2004/0076567 A1 | 4/2004 | Day et al. | |
| 2007/0051096 A1 | 3/2007 | Pfeifer et al. | |
| 2008/0155972 A1 * | 7/2008 | Driscoll et al. | 60/299 |

FOREIGN PATENT DOCUMENTS

| | | |
|---|---|---|
| EP | 0 957 25 4 A2 | 11/1999 |
| JP | A-2000-257417 | 9/2000 |
| JP | A-2003-201888 | 7/2003 |
| JP | A-2004-108176 | 4/2004 |
| JP | A-2006-519331 | 8/2006 |
| WO | WO 99/67511 | 12/1999 |
| WO | WO 00/74823 | 12/2000 |

OTHER PUBLICATIONS

Mar. 1, 2010 Office Action issued in European Patent Application No. 08 721 135.5.

* cited by examiner

*Primary Examiner* — Binh Q Tran
*Assistant Examiner* — Audrey K Bradley
(74) *Attorney, Agent, or Firm* — Oliff & Berridge, PLC

(57) ABSTRACT

An internal combustion engine wherein an HC treatment catalyst (12) having the function of adsorbing the HC in the exhaust gas is arranged upstream of the NOx selective reducing catalyst (14), an urea aqueous solution fed from the reducing agent feed valve (15) is arranged upstream of the HC treatment catalyst (12), urea, and NOx contained in the exhaust gas, and HC adsorbed on the HC treatment catalyst 12 are reacted with each other to form intermediate products having cyano groups, oximes, and amino groups, and these intermediate products are sent to the NOx selective reducing catalyst (14).

5 Claims, 4 Drawing Sheets

| INTERMEDIATE PRODUCTS | | |
|---|---|---|
| CYANO GROUP $>\!\!-CN$ | OXIME $>\!\!-CN-OH$ | AMINO GROUP $>\!\!-NH_2$ |
| CYANOHYDRIN, CYANOCARBON, CYANURIC ACID, ISOCYANURIC ACID, HYDROGEN CYANIDE | ALDOXIME (ALDEHYDE DERIVED) KETOXIME (KETONE DERIVED) | METHYLAMINE, ETHYLAMINE, TRIMETHYLAMINE, TRIETHYLAMINE, ANILINE |

EXHAUST PURIFICATION DEVICE OF INTERNAL COMBUSTION ENGINE

TECHNICAL FIELD

The present invention relates to an exhaust purification device of an internal combustion engine.

BACKGROUND ART

Known in the art is an internal combustion engine arranging an NOx selective reducing catalyst able to reduce NOx in the presence of ammonia in an engine exhaust passage, arranging a reducing agent feed valve for feeding a urea aqueous solution into the engine exhaust passage upstream of the NOx selective reducing catalyst, and reducing the NOx contained in the exhaust gas by the urea aqueous solution fed from the reducing agent feed valve in the NOx selective reducing catalyst (see for example International Patent Publication WO99/67511). In this internal combustion engine, the ammonia formed from the urea aqueous solution fed at the NOx selective reducing catalyst is used to reduce the NOx contained in the exhaust gas.

However, it is known that in this NOx selective reducing catalyst, the ammonia formed from the urea aqueous solution is adsorbed once at the NOx selective reducing catalyst and the adsorbed ammonia reacts with the NOx whereby a reduction action of NOx is carried out. On the other hand, exhaust gas contains hydrocarbons, that is, HC. The HCs also try to be adsorbed at the NOx selective reducing catalyst.

That is, if feeding a urea aqueous solution upstream of the NOx selective reducing catalyst, the ammonia formed from the urea aqueous solution and the HC contained in the exhaust gas compete with each other to be adsorbed at the NOx selective reducing catalyst. In this case, if the amount of HC contained in the exhaust gas becomes large, the amount of adsorption of HC at the NOx selective reducing catalyst increases and as a result the amount of adsorption of ammonia at the NOx selective reducing catalyst is reduced, so the reduction action of the NOx at the NOx selective reducing catalyst ends up being weakened. As a result, there is the problem that a high NOx purification rate by the NOx selective reducing catalyst cannot be obtained.

DISCLOSURE OF THE INVENTION

An object of the present invention is to provide an exhaust purification device of an internal combustion engine able to obtain a high purification efficiency of NOx by an NOx selective reducing catalyst by adsorbing the HC contained in the exhaust gas at an HC treatment catalyst and converting the adsorbed HC into intermediate products.

According to the present invention, there is provided an exhaust purification device of internal combustion engine arranging an NOx selective reducing catalyst able to reduce NOx in the presence of ammonia in an engine exhaust passage, arranging a reducing agent feed valve for feeding a reducing agent containing urea in the engine exhaust passage upstream of the NOx selective reducing catalyst, and reducing the NOx contained in the exhaust gas by the reducing agent fed from the reducing agent feed valve in the NOx selective reducing catalyst, wherein an HC treatment catalyst having the function of adsorbing an HC in the exhaust gas is arranged in the engine exhaust passage between said reducing agent feed valve and NOx selective reducing catalyst, the reducing agent fed from the reducing agent feed valve and the NOx contained in the exhaust gas are reacted with the HC adsorbed on the HC treatment catalyst to form intermediate products having cyano groups, oximes, and amino groups, and the intermediate products are sent to the NOx selective reducing catalyst to promote the action of reduction of NOx contained in the exhaust gas.

BEST MODE FOR CARRYING OUT THE INVENTION

Figure 1:
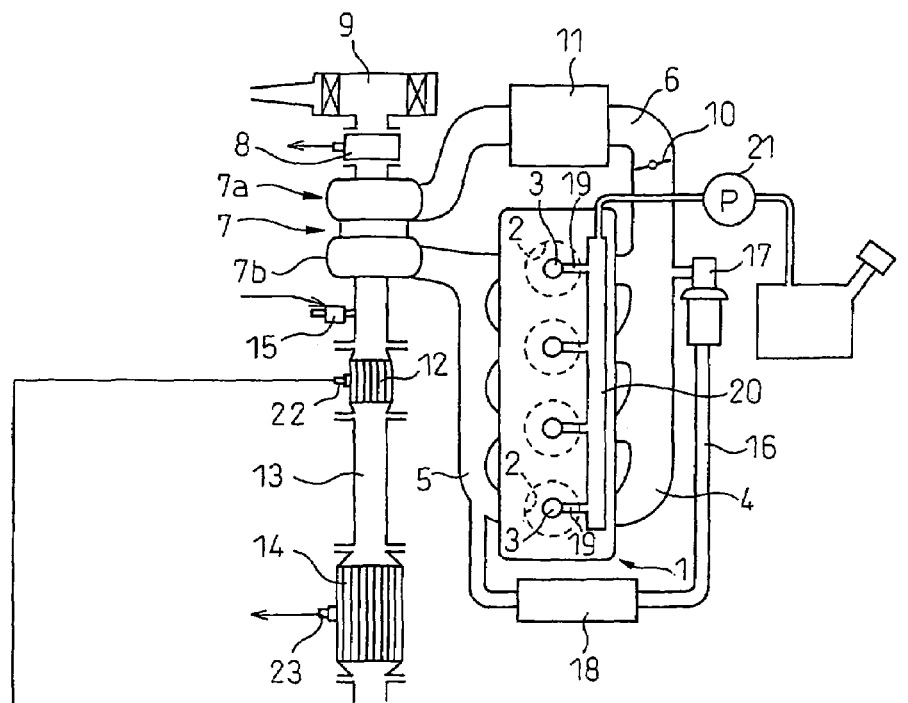
FIG. 1 is an overview of a compression ignition type internal combustion engine.
Figure 1:
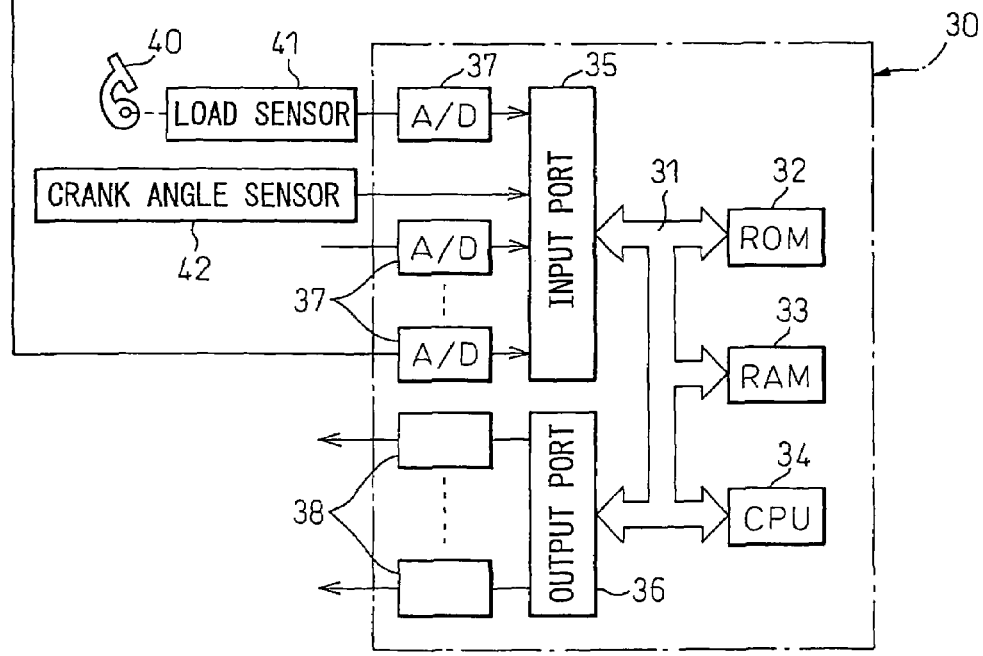

FIG. 1 shows an overview of a compression ignition type internal combustion engine.

Referring to FIG. 1, 1 indicates an engine body, 2 a combustion chamber of each cylinder, 3 an electronic control type fuel injector for injecting fuel into each combustion chamber 2, 4 an intake manifold, and 5 an exhaust manifold. The intake manifold 4 is connected through an intake duct 6 to an outlet of a compressor 7a of the exhaust turbocharger 7, while an inlet of the compressor 7a is connected through an intake air detector 8 to an air cleaner 9. Inside the intake duct 6, a throttle valve 10 driven by a step motor is arranged. Further, around the intake duct 6, a cooling device 11 for cooling the intake air flowing through the inside of the intake duct 6 is arranged. In the embodiment shown in FIG. 1, the engine cooling water is guided to the cooling device 11 where the engine cooling water cools the intake air.

On the other hand, the exhaust manifold 5 is connected to an inlet of an exhaust turbine 7b of the exhaust turbocharger 7, while an outlet of the exhaust turbine 7b is connected to the inlet of an HC treatment catalyst 12 having the function of adsorbing the HC in the exhaust gas. An outlet of an HC treatment catalyst 12 is connected through an exhaust pipe 13 to an NOx selective reducing catalyst 14 able to reduce NOx in the presence of ammonia. In the embodiment shown in FIG. 1, this NOx selective reducing catalyst 14 is comprised of Fe zeolite. Further, upstream of the HC treatment catalyst 12, a reducing agent feed valve 15 for feeding a reducing agent comprised of for example a urea aqueous solution into the exhaust gas is attached.

The exhaust manifold 5 and the intake manifold 4 are interconnected to each other through an exhaust gas recirculation (hereinafter referred to as "EGR") passage 16. Inside the EGR passage 16, an electronic control type EGR control valve 17 is arranged. Further, around the EGR passage 16, a cooling device 18 for cooling the EGR gas flowing through the EGR passage 16 is arranged. In the embodiment shown in FIG. 1, the engine cooling water is guided into the cooling device 18 where the engine cooling water cools the EGR gas. On the other hand, each fuel injector 3 is connected through a fuel feed pipe 19 to a common rail 20. This common rail 20 is supplied with fuel from an electronic control type variable discharge fuel pump 21. The fuel supplied to the common rail 20 is fed through each fuel feed pipe 19 to each fuel injector 3.

The electronic control unit 30 is comprised of a digital computer provided with a ROM (read only memory) 32, RAM (random access memory) 33, CPU (microprocessor) 34, input port 35, and output port 36 all connected to each other through a bi-directional bus 31. The HC treatment catalyst 12 has attached to it a temperature sensor 22 for detecting the temperature of the HC treatment catalyst 12, while the NOx selective reducing catalyst 14 has attached to it a temperature sensor 23 for detecting the temperature of the NOx selective reducing catalyst 14. The output signals of the temperature sensors 22 and 23 and the intake air detector 8 are input through the corresponding AD converters 37 to the input port 35.

An accelerator pedal 40 is connected to a load sensor 41 generating an output voltage proportional to the amount of depression L of the accelerator pedal 40. The output voltage of the load sensor 41 is input through the corresponding AD converter 37 to the input port 35. Further, the input port 35 is connected to a crank angle sensor 42 generating an output pulse each time the crankshaft rotates by for example 15°. On the other hand, the output port 36 is connected through the corresponding drive circuit 38 to a fuel injector 3, a step motor for driving the throttle valve 10, the reducing agent feed valve 15, the EGR control valve 17, and the fuel pump 21.

Figure 2:
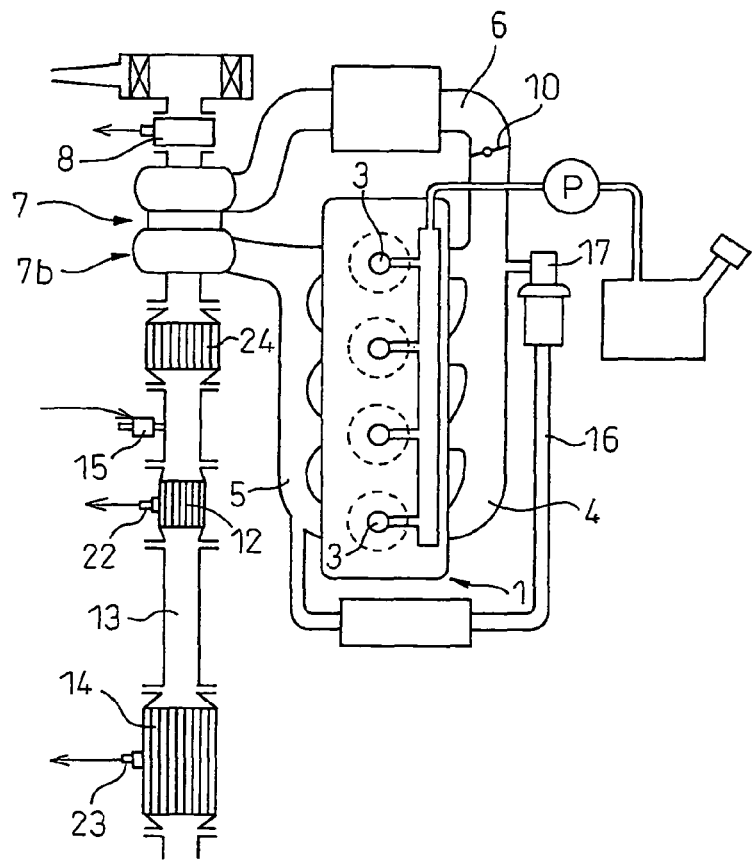
FIG. 2 is an overview of another embodiment of a compression ignition type internal combustion engine.

FIG. 2 shows another embodiment of a compression ignition type internal combustion engine. In this embodiment, an oxidative catalyst 24 is arranged in the exhaust passage upstream of the reducing agent feed valve 15. In this oxidative catalyst 24, the action of converting the NO contained in the exhaust gas to $NO_2$, that is, the action of increasing the $NO_2$ ratio in the NOx, is performed.

Next, the action and reaction occurring in the present invention will be explained with reference to FIG. 3.

The exhaust gas flowing into the HC treatment catalyst 12 contains NOx and HC. Further, the exhaust gas flowing into the HC treatment catalyst 12 contains the urea aqueous solution fed from the reducing agent feed valve 15. Therefore, as shown in FIG. 3, inside the HC treatment catalyst 12, NOx, HC, and urea aqueous solution are fed. Note that in the example shown in FIG. 2, in addition to the above $NO_2$ ratio increasing action at the oxidative catalyst 24, an oxidative action of the HC contained in the exhaust gas is performed, but all of the HC contained in the exhaust gas is not oxidized, so in this case as well, as shown in FIG. 3, HC flows into the HC treatment catalyst 12.

Now, as explained above, the HC treatment catalyst 12 has the function of adsorbing HC. Therefore, the HC flowing into the HC treatment catalyst 12 is adsorbed at the HC treatment catalyst 12. On the other hand, the NOx and urea $(NH_2)_2CO_3$ flowing into the HC treatment catalyst 12 and HC adsorbed at the HC treatment catalyst 12 react with each other as shown in FIG. 3 whereby the intermediate products are formed. The representative intermediate products formed at this time are shown in FIG. 4.

Figures 4, 5:
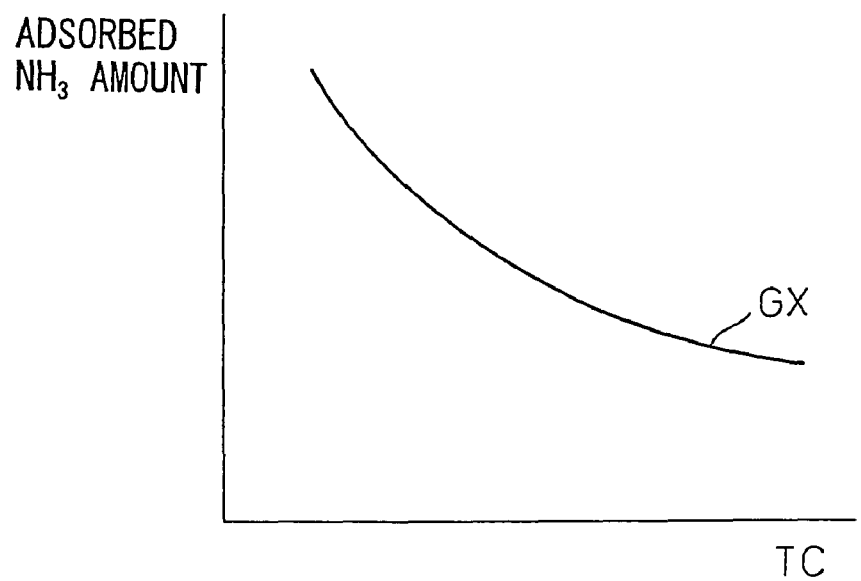
FIG. 4 is a view for explaining intermediate products.
FIG. 5 is a view showing an amount of adsorbed ammonia.

As shown in FIG. 4, the representative intermediate products have cyano groups, oximes, or amino groups. As intermediate products having cyano groups mentioned in FIG. 4, cyanohydrin, cyanocarbon, cyanuric acid, isocyanuric acid, hydrogen cyanide, etc. are formed, as intermediate products having oximes, aldoxime, ketoxime, etc. are formed, and as intermediate products having amino groups, methylamine, ethylamine, trimethylamine, triethylamine, aniline, etc. are formed. These intermediate products are in the state of the intermediate change to $N_2$, $CO_2$, $H_2O$, and $NH_3$, in other words, the state right before changing to $N_2$, $CO_2$, $H_2O$, and $NH_3$.

Figure 3:
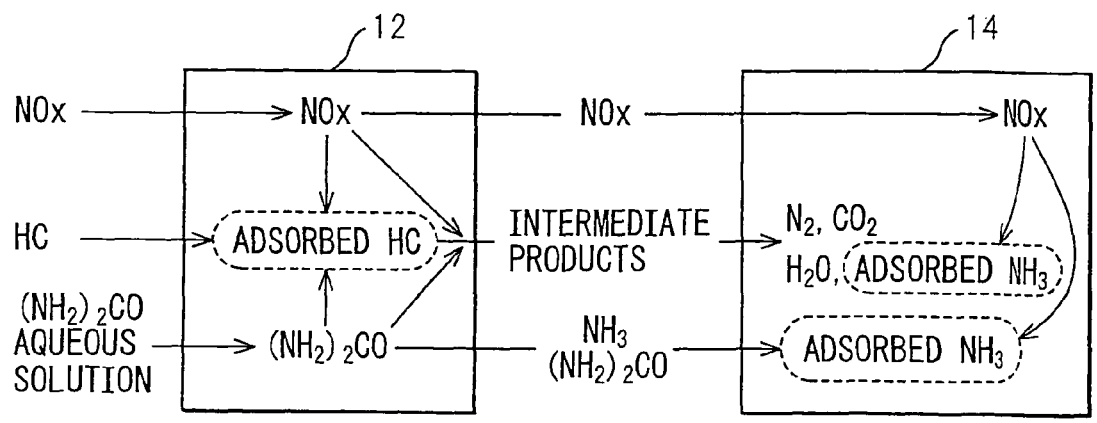
FIG. 3 is a view for explaining an action and reaction of an HC treatment catalyst 12 and NOx selective reducing catalyst 14.

The intermediate products formed at the HC treatment catalyst 12 are exhausted from the HC treatment catalyst 12 and, as shown in FIG. 3, flow into the NOx selective reducing catalyst 14. Further, as shown in FIG. 3, the NOx not reacting with the adsorbed HC or urea $(NH_2)_2CO$ at the HC treatment catalyst 12, the ammonia $NH_3$ formed from the urea $(NH_2)_2CO$ at the HC treatment catalyst 12, and the urea $(NH_2)_2CO$ passing through the HC treatment catalyst 12 flow into the NOx selective reducing catalyst 14.

As shown in FIG. 3, when the intermediate products flow into the NOx selective reducing catalyst 14, they change to $N_2$, $CO_2$, $H_2O$, and $NH_3$. In this case, the $NH_3$ formed from the intermediate products having amino groups is adsorbed at the NOx selective reducing catalyst 14. On the other hand, as shown in FIG. 3, the ammonia $NH_3$ flowing into the NOx selective reducing catalyst 14 is adsorbed by the NOx selective reducing catalyst 14, while the urea $(NH_2)_2CO$ flowing into the NOx selective reducing catalyst 14 is also adsorbed in the form of ammonia $NH_3$ on the NOx selective reducing catalyst 14. The NOx reacts with the adsorbed ammonia $NH_3$ whereby the NOx is reduced. Therefore, the NOx is purified well in the NOx selective reducing catalyst 14.

When HC flows into the NOx selective reducing catalyst 14, the region in the NOx selective reducing catalyst 14 where the ammonia $NH_3$ is adsorbed is reduced. As a result, the amount of adsorption of ammonia $NH_3$ is reduced, so the purification efficiency of NOx falls. Therefore, in the present invention, the HC contained in the exhaust gas is made to be adsorbed at the HC treatment catalyst 12 to prevent HC from flowing into the NOx selective reducing catalyst 14 and the HC adsorbed at the HC treatment catalyst 12 is changed to immediately preceding intermediate products forming $N_2$, $CO_2$, $H_2O$, and $NH_3$.

In the HC treatment catalyst 12, part of the NOx is reduced by the ammonia $NH_3$ formed from the urea. However, the most important reaction to be caused in the HC treatment catalyst 12 is the reaction for reacting the NOx, adsorbed HC, and urea $(NH_2)_2CO$ with each other to form intermediate products. This is because if intermediate products are formed, the intermediate products can easily change to $N_2$, $CO_2$, $H_2O$, and $NH_3$ at the downstream NOx selective reducing catalyst 14.

In this case, there is no meaning even if forming large amounts of intermediate products at the downstream NOx selective reducing catalyst 14. This is because if forming large amounts of intermediate products at the downstream NOx selective reducing catalyst 14, there is a good possibility that these intermediate products will end up being exhausted into the atmosphere. As opposed to this, if forming intermediate products at the HC treatment catalyst 12, these will necessarily change into $N_2$, $CO_2$, $H_2O$, and $NH_3$ at the downstream NOx selective reducing catalyst 14. Therefore, the present invention is designed to form as large amounts of intermediate products at the HC treatment catalyst 12 as possible.

However, intermediate products having cyano groups or oximes are strong in toxicity. Therefore, in an ordinary internal combustion engine, these intermediate products having cyano groups or oximes are prevented from being formed as much as possible. As opposed to this, the present invention is characterized by forming these toxic intermediate products having cyano groups or oximes in as large amounts as possible. Therefore, the present invention can be understood as being completely different from usual internal combustion engines.

To form intermediate products in the HC treatment catalyst 12, it is necessary that the reaction is not be completed at the HC treatment catalyst 12, that is, the reaction be incomplete at the HC treatment catalyst 12. For this reason, it is necessary to increase the spatial velocity of the flow of exhaust gas in the HC treatment catalyst 12. Therefore, in the embodiment of the present invention, as shown in FIG. 1 and FIG. 2, the volume of the HC treatment catalyst 12 is considerably smaller than the volume of the NOx selective reducing catalyst 14, for example, is less than a fraction of the same. Note that to form intermediate products, the HC treatment catalyst 12 must be held at a certain high temperature. For this reason, the HC treatment catalyst 12 is arranged near the exhaust manifold 5 as shown in FIG. 1 and FIG. 2.

Further, to purify the NOx well in the NOx selective reducing catalyst 14, it is necessary to make as large an amount of ammonia $NH_3$ be adsorbed at the NOx selective reducing catalyst 14 at all times. However, the maximum ammonia adsorption amount GX of the adsorption of the NOx selective reducing catalyst 14, as shown in FIG. 5, falls the higher the temperature TC of the NOx selective reducing catalyst 14. In this embodiment according to the present invention, control is performed to feed a urea aqueous solution so that the ammonia adsorption amount is maintained at this maximum ammonia adsorption amount GX. Note that at this time, the HC treatment catalyst 12 is filled with enough urea $(NH_2)_2CO$ for forming a large amount of intermediate products.

As the HC treatment catalyst 12, an HC adsorption catalyst can be used. Further, when the NOx selective reducing catalyst has the function of adsorbing HC, it is possible to use an NOx selective reducing catalyst as the HC treatment catalyst 12.

Next, the routine for controlling the feed of the urea aqueous solution will be explained with reference to FIG. 6. Note that this routine is executed by interruption.

Figure 6:
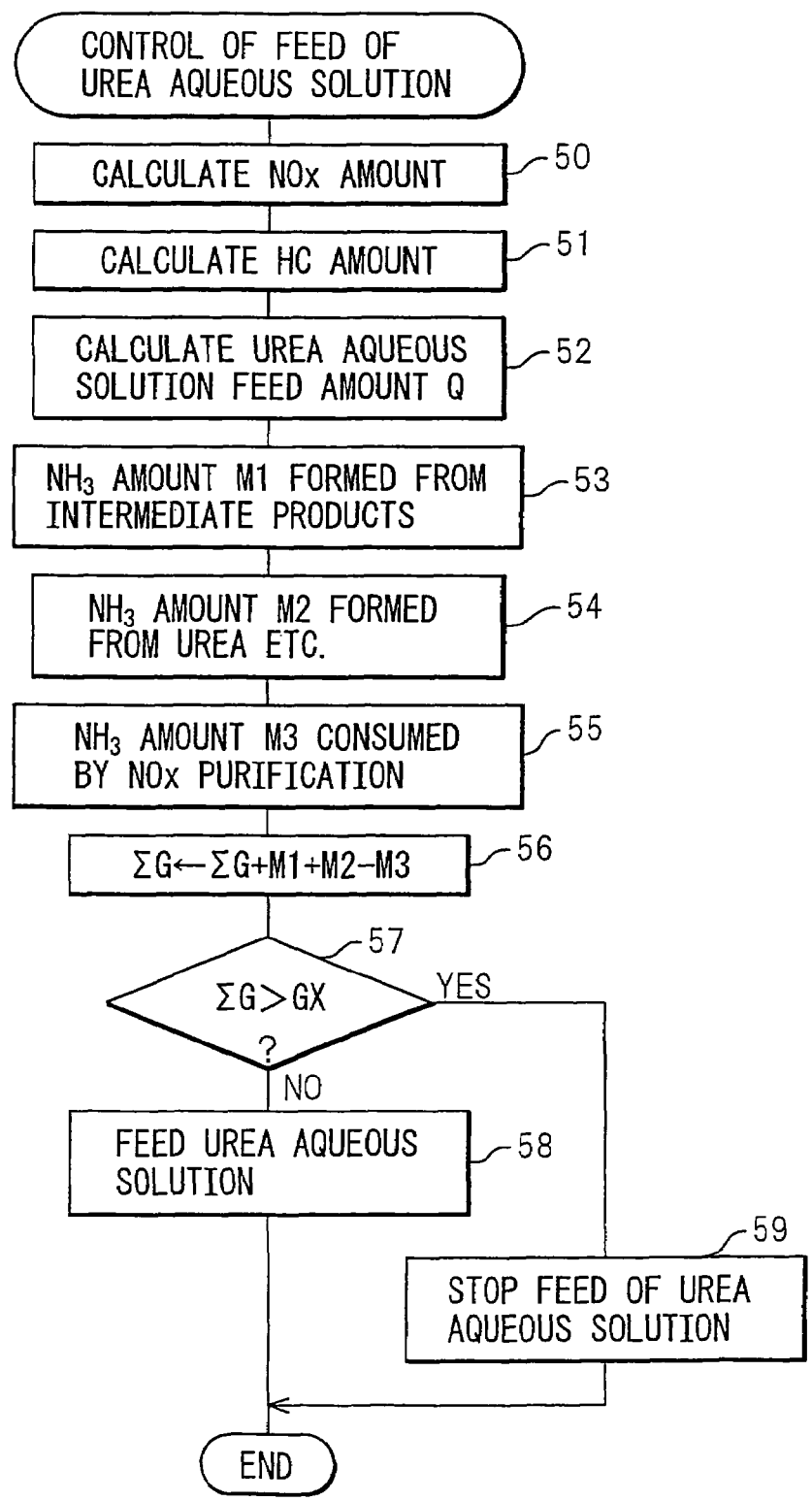
FIG. 6 is a flowchart of the control for feeding a urea aqueous solution.

Referring to FIG. 6, first, at step 50, the NOx amount exhausted from the engine per unit time is calculated. This NOx amount is stored in advance in the ROM 32 with respect to the different engine operating states. Next, at step 51, the amount of HC exhausted from the engine per unit time is calculated. This HC amount is also stored in advance in the ROM 32 with respect to the different engine operating states.

Next, at step 52, the amount Q of feed of urea aqueous solution per unit time is calculated. Next, at step 53, the amount M1 of the ammonia $NH_3$ formed from the intermediate products at the NOx selective reducing catalyst 14 and adsorbed at the NOx selective reducing catalyst 14 is calculated. Next, at step 54, the amount M2 of the ammonia $NH_3$ formed from the urea passing through the HC treatment catalyst 12 and adsorbed at the NOx selective reducing catalyst 14 and the ammonia $NH_3$ exhausted from the HC treatment catalyst 12 and adsorbed at the NOx selective reducing catalyst 14 is calculated. Next, at step 55, the amount M3 of ammonia $NH_3$ consumed for purifying the NOx exhausted from the HC treatment catalyst 12 at the NOx selective reducing catalyst 14 is calculated. These ammonia amounts M1, M2, and M3 are stored as functions of the temperature of the HC treatment catalyst 12, intake air amount, NOx amount and HC amount exhausted from the engine, and urea aqueous solution feed amount Q in advance in the ROM 32.

Next, at step 56, the newly adsorbed ammonia amount (M1+M2) is added to the ammonia amount $\Sigma G$ adsorbed in the NOx selective reducing catalyst 14 and the consumed ammonia amount M3 is subtracted from this ammonia amount $\Sigma G$, whereby the adsorbed ammonia amount $\Sigma G$ is calculated. Next, at step 57, it is judged if the adsorbed ammonia amount $\Sigma G$ has exceeded the maximum adsorbed ammonia amount GX shown in FIG. 5. When $\Sigma G \leq GX$, the routine proceeds to step 58 where the action of feeding the urea aqueous solution is continued, while when $\Sigma G > GX$, the routine proceeds to step 59 where the action of feeding the urea aqueous solution is stopped.

DESCRIPTION OF NOTATIONS

4 . . . intake manifold
5 . . . exhaust manifold
7 . . . exhaust turbocharger
12 . . . HC treatment catalyst
14 . . . NOx selective reducing catalyst
15 . . . reducing agent feed valve

The invention claimed is:

1. An exhaust purification device of an internal combustion engine comprising:
    an NOx selective reducing catalyst arranged to be able to reduce NOx in the presence of ammonia in an engine exhaust passage;
    a urea aqueous solution feed valve for feeding a urea aqueous solution in the engine exhaust passage upstream of the NOx selective reducing catalyst;
    wherein the NOx contained in the exhaust gas is reduced by the urea aqueous solution fed from the urea aqueous solution feed valve in the NOx selective reducing catalyst,
    wherein an HC adsorption catalyst having the function of adsorbing HC in the exhaust gas is arranged in the engine exhaust passage between said urea aqueous solution feed valve and the NOx selective reducing catalyst,
    wherein the urea aqueous solution fed from the urea aqueous solution feed valve and the NOx contained in the exhaust gas are reacted with the HC adsorbed on the HC adsorption catalyst to form intermediate products having cyano groups, oximes, and amino groups, and the intermediate products are sent to the NOx selective reducing catalyst to promote the action of reduction of NOx contained in the exhaust gas, and
    wherein a routine executed by the exhaust purification device calculates:
        an amount M1 of ammonia formed from the intermediate products at the NOx selective reducing catalyst,
        an amount M2 of the ammonia formed from the urea passing through the HC adsorption catalyst and adsorbed at the NOx selective reducing catalyst and the ammonia exhausted at the NOx selective reducing catalyst, and
        an amount M3 of ammonia consumed for purifying NOx exhausted from the HC adsorption catalyst at the NOx selective reducing catalyst.

2. An exhaust purification device of internal combustion engine as set forth in claim 1, wherein an action for feeding the urea aqueous solution from the urea aqueous solution feed valve is controlled based on the routine executed by the exhaust purification device.

3. An exhaust purification device of internal combustion engine as set forth in claim 1, wherein said HC adsorption catalyst is comprised of an NOx selective reducing catalyst.

4. An exhaust purification device of internal combustion engine as set forth in claim 1, wherein an oxidative catalyst is arranged upstream of said urea aqueous solution feed valve.

5. An exhaust purification device of internal combustion engine as set forth in claim 1, wherein the routine executed by the exhaust purification device further determines an amount $\Sigma G$ of adsorbed ammonia, where $\Sigma G = \Sigma + M1 + M2 - M3$, and judges whether $\Sigma G$ is greater than a maximum adsorbed ammonia amount GX.

* * * * *